US00RE48537E

(19) United States
(12) Reissued Patent
Dhiman et al.

(10) Patent Number: US RE48,537 E
(45) Date of Reissued Patent: Apr. 27, 2021

(54) FILTER ELEMENT WITH FEATURES TO IMPROVE PRE-CLEANING PERFORMANCE, SEALING, AND STRUCTURAL SUPPORT

(71) Applicant: Cummins Filtration IP Inc., Columbus, IN (US)

(72) Inventors: Rajeev Dhiman, Pune (IN); Jim Alonzo, Verona, WI (US); Kelly Detra, Brooklyn, WI (US); Barry Mark Verdegan, Stoughton, WI (US)

(73) Assignee: CUMMINS FILTRATION IP INC., Columbus, IN (US)

(21) Appl. No.: 15/936,876

(22) Filed: Mar. 27, 2018

Related U.S. Patent Documents

Reissue of:
(64) Patent No.: 9,498,743
Issued: Nov. 22, 2016
Appl. No.: 14/453,084
Filed: Aug. 6, 2014

U.S. Applications:
(62) Division of application No. 13/234,309, filed on Sep. 16, 2011, now Pat. No. 8,828,114.

(60) Provisional application No. 61/383,621, filed on Sep. 16, 2010.

(51) Int. Cl.
*B01D 46/24* (2006.01)
*B01D 46/00* (2006.01)

(52) U.S. Cl.
CPC ..... *B01D 46/2414* (2013.01); *B01D 46/0005* (2013.01); *B01D 46/008* (2013.01); *B01D 2265/021* (2013.01); *B01D 2265/026* (2013.01)

(58) Field of Classification Search
CPC .. G01J 3/526; G01J 3/528; G06T 7/90; G06T 11/001; G06T 2207/10024; G06F 16/5838; G06F 16/954
See application file for complete search history.

(56) References Cited

U.S. PATENT DOCUMENTS 3,745,753 A 7/1973 Risse
3,928,007 A 12/1975 Jackson
5,545,241 A 8/1996 Vanderauwera et al.
(Continued)

FOREIGN PATENT DOCUMENTS

CN 101048215 10/2007
WO WO 2004/039476 5/2004
(Continued)

OTHER PUBLICATIONS

First Office Action issued for Indian Patent Application No. 2835/KOLNP/2012, dated Jul. 17, 2018, 9 pages.
(Continued)

*Primary Examiner* — Krisanne M Jastrzab
(74) *Attorney, Agent, or Firm* — Foley & Lardner LLP

(57) ABSTRACT

Disclosed are filter assembly systems that utilize replaceable filter elements. The filter elements may include a ramp or sleeve for redirecting air intake when the filter elements are installed in the filter assembly systems and air is drawn into the systems. The filter elements and assembly systems may utilize co-acting components that mate with each other to at least one of: a) orient and permit mounting of the filter element in the systems; and b) permit mounting of only an authorized filter element in the systems.

28 Claims, 8 Drawing Sheets

(56) References Cited

U.S. PATENT DOCUMENTS

| | | | |
|---|---|---|---|
| 5,891,337 | A | 4/1999 | Keller et al. |
| 6,039,778 | A | 3/2000 | Coulonvaux |
| 6,051,042 | A | 4/2000 | Coulonvaux |
| 6,334,887 | B1 | 1/2002 | Coulonvaux |
| 6,419,718 | B1 | 7/2002 | Klug et al. |
| 6,902,598 | B2 | 6/2005 | Gunderson et al. |
| 6,958,083 | B1 | 10/2005 | Schmitz et al. |
| 7,070,642 | B2 | 7/2006 | Scott et al. |
| 7,097,694 | B1 | 8/2006 | Jaroszczyk et al. |
| 7,125,490 | B2 | 10/2006 | Clendenning et al. |
| 7,276,098 | B2 | 10/2007 | Koslow |
| 7,282,077 | B2 | 10/2007 | Honisch et al. |
| 7,314,558 | B1 | 1/2008 | Jaroszczyk et al. |
| 7,323,105 | B1 | 1/2008 | Janikowski et al. |
| 7,323,106 | B2 | 1/2008 | Jaroszczyk et al. |
| 7,413,588 | B2 | 8/2008 | Holzmann et al. |
| 7,537,631 | B2 | 5/2009 | Scott et al. |
| 7,540,895 | B2 | 6/2009 | Furseth et al. |
| 7,563,300 | B2 | 7/2009 | Nishiyama et al. |
| D600,790 | S | 9/2009 | Nelson et al. |
| 7,625,419 | B2 | 12/2009 | Nelson et al. |
| 7,645,546 | B2 | 1/2010 | Haberkamp et al. |
| 7,648,546 | B2 | 1/2010 | Haberkamp et al. |
| 7,658,777 | B2 | 2/2010 | Kopec et al. |
| 7,662,203 | B2 | 2/2010 | Scott et al. |
| 7,662,216 | B1 | 2/2010 | Terres et al. |
| 7,740,678 | B2 | 6/2010 | Gunderson et al. |
| 7,753,982 | B2 | 7/2010 | Merritt |
| RE41,713 | E | 9/2010 | Gunderson et al. |
| 7,789,926 | B2 | 9/2010 | Rieger et al. |
| 7,799,108 | B2 | 9/2010 | Connor et al. |
| 7,828,870 | B1 | 11/2010 | Rech et al. |
| 7,879,125 | B2 | 2/2011 | Haberkamp et al. |
| RE42,174 | E | 3/2011 | Gunderson et al. |
| 7,931,725 | B2 | 4/2011 | Wydeven et al. |
| 7,959,703 | B2 | 6/2011 | Merritt et al. |
| 7,976,601 | B2 | 7/2011 | Xu et al. |
| 7,981,183 | B2 | 7/2011 | Nepsund et al. |
| 7,981,186 | B2 | 7/2011 | Schrage et al. |
| 7,988,757 | B2 | 8/2011 | Scott et al. |
| 7,993,422 | B2 | 8/2011 | Krisko et al. |
| 8,038,756 | B2 | 10/2011 | Iddings et al. |
| 8,177,874 | B2 | 5/2012 | Bittle et al. |
| 8,177,971 | B2 | 5/2012 | Bittle et al. |
| 8,216,335 | B2 | 7/2012 | Scott et al. |
| 8,394,166 | B2 | 3/2013 | Scott et al. |
| 8,460,425 | B2 | 6/2013 | Scott et al. |
| 8,545,588 | B2 | 10/2013 | Iddings et al. |
| 8,828,114 | B2 | 9/2014 | Dhiman et al. |
| 9,498,743 | B2 | 11/2016 | Dhiman et al. |
| 2004/0134171 | A1* | 7/2004 | Scott ..... B01D 46/0001 55/482 |
| 2005/0193695 | A1 | 9/2005 | Holmes et al. |
| 2006/0086075 | A1* | 4/2006 | Scott ..... B01D 46/0001 55/498 |
| 2008/0190082 | A1 | 8/2008 | Scott et al. |
| 2009/0094951 | A1* | 4/2009 | Baseotto ..... B01D 46/0024 55/498 |
| 2009/0126324 | A1 | 5/2009 | Smith et al. |
| 2010/0146920 | A1 | 6/2010 | Iddings et al. |

FOREIGN PATENT DOCUMENTS

| | | |
|---|---|---|
| WO | WO 2008/124437 | 10/2008 |
| WO | WO 2009/019443 | 2/2009 |

OTHER PUBLICATIONS

International Preliminary Report on Patentability, PCT/US2011/051880, dated Mar. 28, 2013.

Fist Office Action for Chinese Patent App. No. 201180030354.5 dated Apr. 18, 2014, 36 pages (with translation).

International Search Report for PCT/US2011/051880 dated Jan. 20, 2012.

Written Opinion for PCT/US2011/051880 dated Jan. 20, 2012.

* cited by examiner

FILTER ELEMENT WITH FEATURES TO IMPROVE PRE-CLEANING PERFORMANCE, SEALING, AND STRUCTURAL SUPPORT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED PATENT APPLICATIONS

The present application claims the benefit under 35 U.S.C. § 119(e) to U.S. Provisional Application No. 61/383,621, filed on Sep. 16, 2010, the content of which is incorporate herein by reference in its entirety.

BACKGROUND OF THE INVENTION

The field of the invention relates to filter assemblies and systems. In particular, the field of the invention relates to filter assemblies for air intake systems. Filter assemblies, including assemblies that utilize annular filter elements, are known in the art. (See. e.g., U.S. Pat. Nos. 7,993,422; 7,981,183; 7,976,601; 7,959,703; 7,931,725; RE42,174; 7,879,125; 7,528,870; RE41,713; 7,799,108; 7,789,926; 7,753,982; 7,740,678; 7,662,216; 7,648,546; 7,625,419; 0600,790; 7,563,300; 7,540,895; 7,413,588; 7,323,106, 7,323,105; 7,314,558; 7,282,077; 7,276,098; 7,125,490; 7,097,694; and 6,902,598; the contents of which are incorporated herein by reference in their entireties).

In order to ensure reliable, robust engine operation, engines must be protected from contaminants entering via the air intake system. Filter assembly systems utilize filter elements in this regard to remove contaminants from air intake. In order to improve filter assembly efficiency, it is desirable to incorporate pre-cleaner features into components of the filter assembly. A further issue in filter assemblies is the installation or attempted installation of incorrectly oriented filter elements or unauthorized filter elements that may adversely impact the engine. It is desirable to incorporate features into filter assembly systems in order to reduce or prevent installation of incorrectly oriented filter elements or unauthorized filter elements within filter assembly systems. Accordingly, disclosed herein are pre-cleaner features and installation elements.

SUMMARY OF THE INVENTION

Disclosed are replaceable filter elements and filter assemblies comprising a housing chamber for mounting the filter element. The filter element typically is annular and comprises filter media and end seal caps heated at each end of the filter media.

In some embodiments, the filter element may comprise a ramp adjacent to, and optionally integrated with, an end seal cap of the filter element. The ramp may be present on a sleeve that is adjacent to, and optionally integrated with, an end seal cap of the filter element. The housing typically comprises a chamber, and the housing further comprises an inlet for drawing air into the chamber, and an outlet for emitting air from the chamber. Typically, the inlet is located radially on the housing and the outlet is located axially on the housing. The housing typically comprises end caps located at each of the housing chamber. When the filter element is mounted in the housing chamber, the end seal caps of the filter element typically contact and seal against the end caps of the housing chamber. Suitable seals may include facial seals and radial seals. Further, when the filter element is mounted in the housing chamber, the ramp of the filter element typically aligns with the chamber at the inlet, optionally seals against an edge of the inlet, and directs air around the filter media and axially away from the inlet when air is drawn through the inlet.

In further embodiments, at least one of the end caps of the housing chamber and at least one of the end seal caps of the tiller element comprise first and second co-acting components mating with each other to at least one of: a) orient and permit mounting of the filter element in the housing chamber, for example, where an edge of the ramp is oriented adjacent to an edge of the inlet and aligns with the edge of the inlet and optionally seals against the edge of the inlet; and b) permit mounting of only an authorized filter element in the housing chamber, namely a filter element comprising the second co-acting keyed component to mate with the first co-acting keyed component of the housing chamber. Suitable co-acted keyed components may include male and female chords, tabs and slots, and tapered faces. Optionally, the end seal cap of the filter element may be tapered, for example, the end seal cap that seals at the outlet end of the housing chamber, and the corresponding end cap of the housing chamber may be correspondingly tapered for sealing against the tapered face of the end seal cap of the element.

DETAILED DESCRIPTION OF THE PREFERRED EMBODIMENTS

Figure 1:
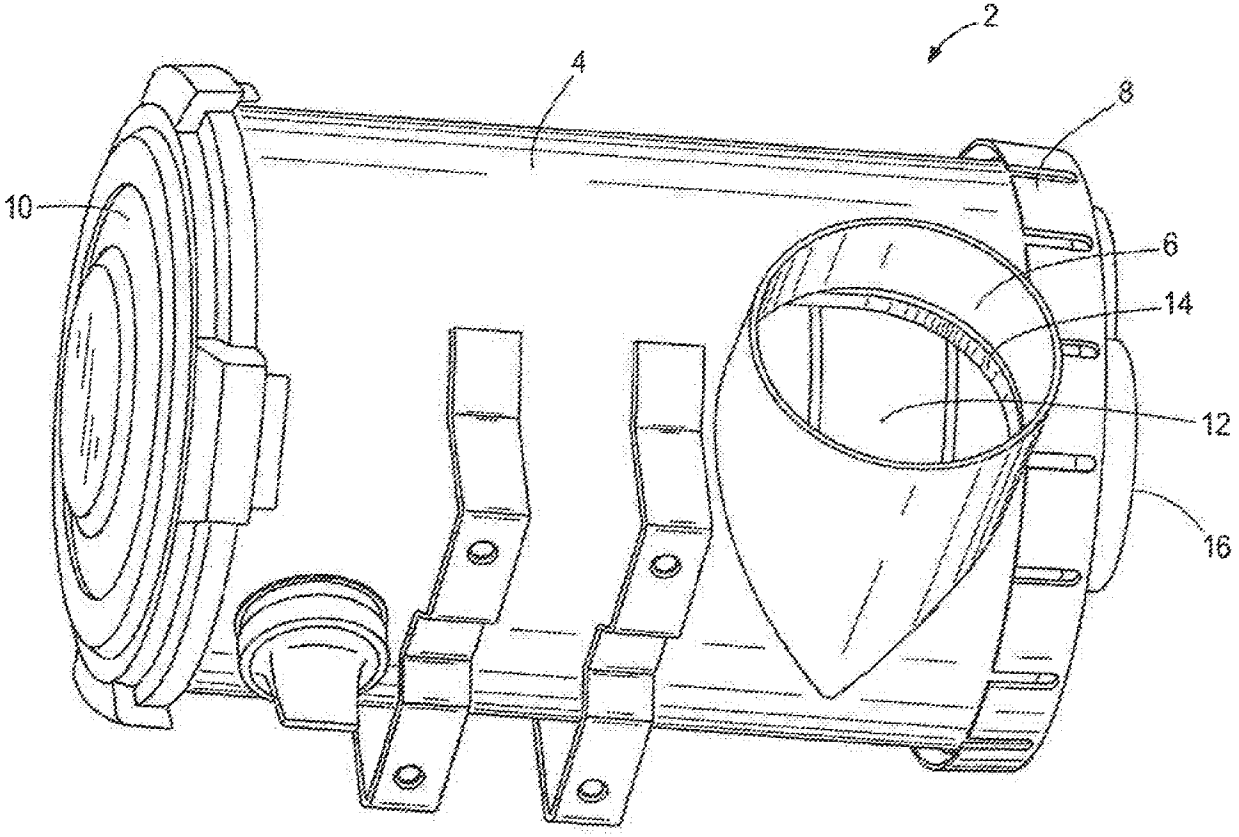
FIG. 1 illustrates one embodiment of a filter assembly as contemplated herein.

Disclosed are replaceable filter elements and filter assemblies comprising a housing chamber for mounting the filter element. In some embodiments, the filter elements include a ramp that optionally may be present on a circumferential sleeve located at one end of the filter element. In other embodiments, the filter elements and assemblies may utilize keyed components for orienting and permitting mounting of the filter element in a chamber of the housing, for example, orienting the ramp adjacent to an edge of an inlet of the housing chamber and permitting mounting of only an authorized filter element in the housing chamber.

The disclosed filter assemblies may include components that may be cylindrical, substantially cylindrical, or non-cylindrical (e.g., filter elements or housing chambers that are cylindrical, substantially cylindrical, or non-cylindrical). In some embodiments, the components of the disclosed filter assemblies are oval-shaped, racetrack-shaped, obround-shaped, or another closed-loop shape.

The disclosed filter assemblies may include components that are substantially cylindrical. As used herein, an component that is "substantially cylindrical" may be defined as a component that has a circular cross-section or a component that has a non-circular cross-section (e.g., an oval cross-section), where a longest diameter of the non-circular cross-section $d_{max}$ and the shortest diameter of the non-circular cross-section $d_{min}$ meet the following criteria:

$$(d_{max}-d_{min})/d_{min}<20\%.$$

In one embodiment, the filter assemblies comprise a filter element which incorporates an integrated pre-cleaner ramp which improves pre-cleaner efficiency and maximizes the service interval. The ramp may be present on a circumferential sleeve that is located at an end of the filter element and adjacent to an end seal cap of the filter element. The ramp or sleeve also may provide structural support to the filter element in the event or a radial impact such as might occur if the filter element was dropped or received a radial blow during servicing. Typically, the ramp is aligned or adjacent to a radial inlet on the housing to direct intake air spirally around the filter element and axially away from the inlet. Optionally, the ramp may seal against an edge of the inlet. In order to ensure proper installation orientation, the sealing geometry on both the filter element and housing may be designed with a mating interface to facilitate or ensure proper installation of the filter element.

The disclosed filter elements may comprise a ramp that enhances pre-cleaner efficiency in filter assembly systems in which the filter element is utilized. For example, the disclosed filter elements may exhibit >20% enhanced pre-cleaner efficiency. By adding the ramp to the filter element, improved pre-cleaner performance can be achieved without adding significant cost to a filter assembly system.

Typically, the orientation of the filter element in the housing chamber is selected in order to obtain the pre-cleaner efficiency improvements disclosed herein. Desirable orientation may be achieved via first and second co-acting components present on the housing (for example, present on the housing chamber at an end cap of the housing chamber) and the filter element {for example, present of an end seal cap of the filter element). The components may mate with each other, tier example as male and female components, to at least one of: a) orient and permit mounting of the filter element in the housing; and b) permit mounting of only an authorized filter element in the housing, namely a filter element comprising the second co-acting keyed component to mate with the first co-acting keyed component of the housing. As such, the co-acting components may prevent improper installation of a filter element in the housing. The co-acting components also may prevent installation of an incorrectly sized filter element, for example, a filter element having a radial seal of similar but incorrect size.

In addition, the ramp or sleeve may provide radial structure to the filter element and prevent damage from radial impact during installation or removal. For example, radial impacts may occur from dropping element at certain angles or during shipment where a shipping package is crushed. In these instances, the ramp or sleeve may guard against radial damage to the filter element.

In some embodiments of the disclosed filter assemblies, a pre-cleaner ramp or sleeve component may be potted in urethane to provide a structural member of the filter element and improve pre-cleaner efficiency of filter assemblies in which the filter element is utilized. Alternatively, the pre-cleaner ramp or sleeve could be an integral part of the end seal member made of a thermoplastic, into which the ends of the filter media are embedded.

The geometry of an end seal cap of the filter element may be designed to interface with a corresponding geometry in a housing chamber in which the filter element is mounted to ensure proper filter installation/orientation (e.g., corresponding geometry present on an end cap of the housing chamber). In further embodiments, the disclosed filter assemblies may include one or more of the following features: (1) a pre-cleaner ramp or sleeve component integral to the assembly (e.g., integral to the filter element); (2) a ramp or sleeve that provides radial structural support to the filter element; (3) a seal geometry on the filter element and corresponding mating geometry on the housing to prevents improper orientation or installation of an unauthorized filter element; and (4) as a tapered face on an open end of the filter element and a corresponding tapered face on the housing which may facilitate installation and removal of the filter element during servicing.

Referring now to the figures, FIG. 1 illustrates one embodiment of a filter assembly 2 as contemplated herein. The filter assembly includes a housing chamber 4 having an inlet 6 and an outlet 16. Optionally, the inlet is a radial inlet and the outlet is an axial outlet. The housing chamber includes end caps 8 and [I O] *10*. As shown in FIG. 1, one end cap *10* is closed [10] and one end cap 8 includes the outlet 16 or otherwise is open. A filter element 12 is mounted within the housing chamber 4 and includes a ramp 14 that aligns with the inlet 6 and directs influent air around the filter element 12.

Figure 2:
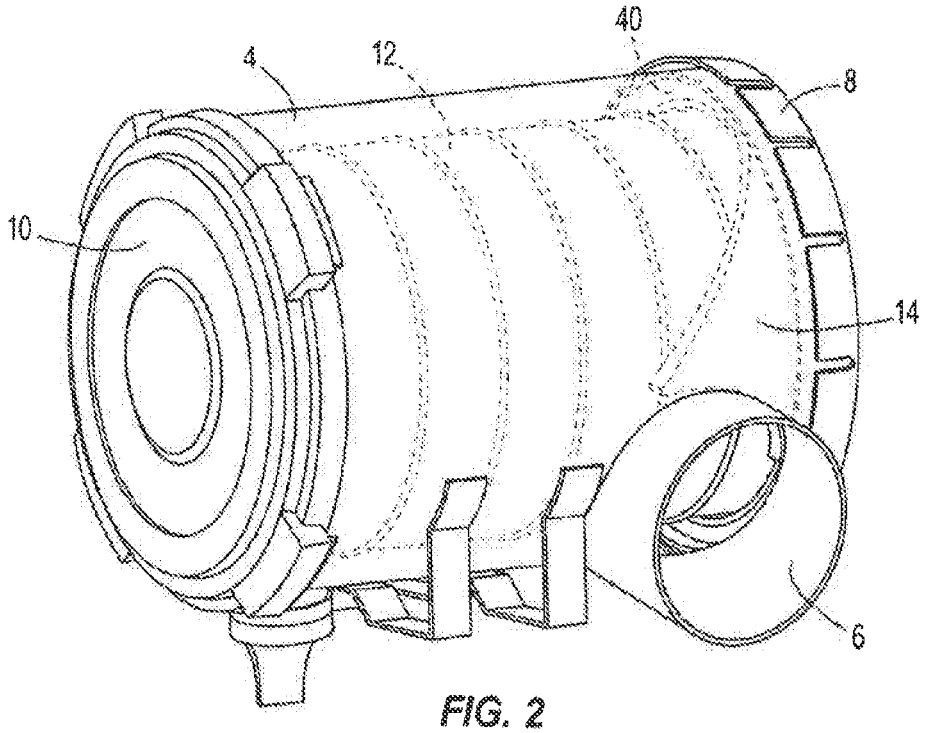
FIG. 2 illustrates a view of one embodiment of a filter element mounted in end caps of a housing chamber.
Figure 3:
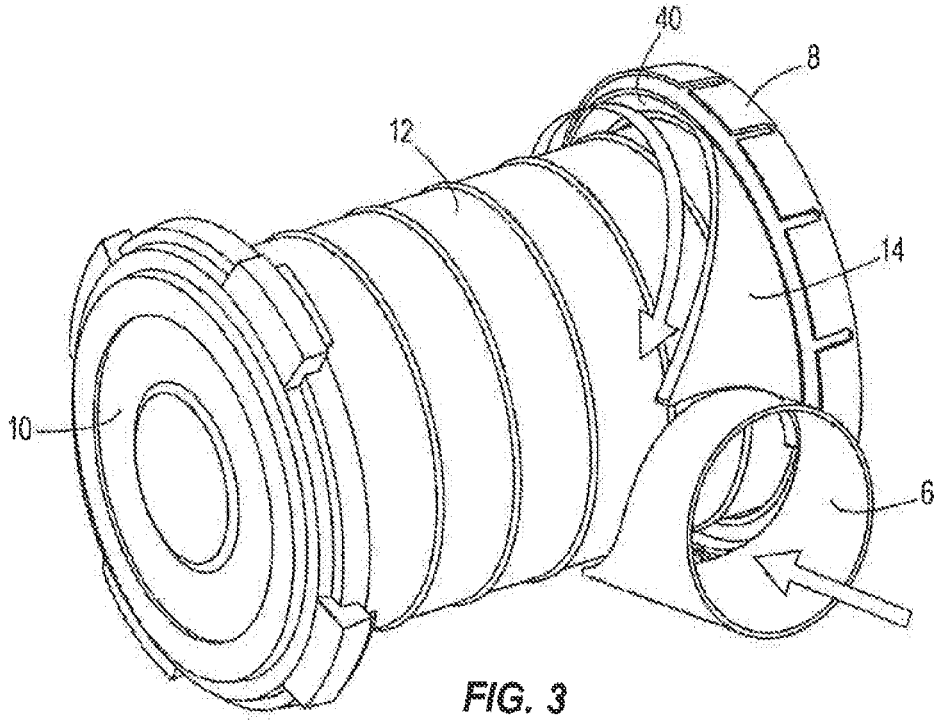
FIG. 3 illustrates a view of one embodiment of a filter element mounted in end caps of a housing chamber with the housing chamber not disclosed for clarity.

FIG. 2 illustrates a view of one embodiment of a filter element 12 mounted in the end caps 8, [I O] *10* of the housing chamber 4. As shown in FIG. 3, the inlet 6 aligns with the ramp 14 which directs influent air around the filter element 12 and axially upward as illustrated by arrows. The housing chamber 4 is not shown in FIG. 3 to illustrate internal air flow.

Figures 4A, 4B:
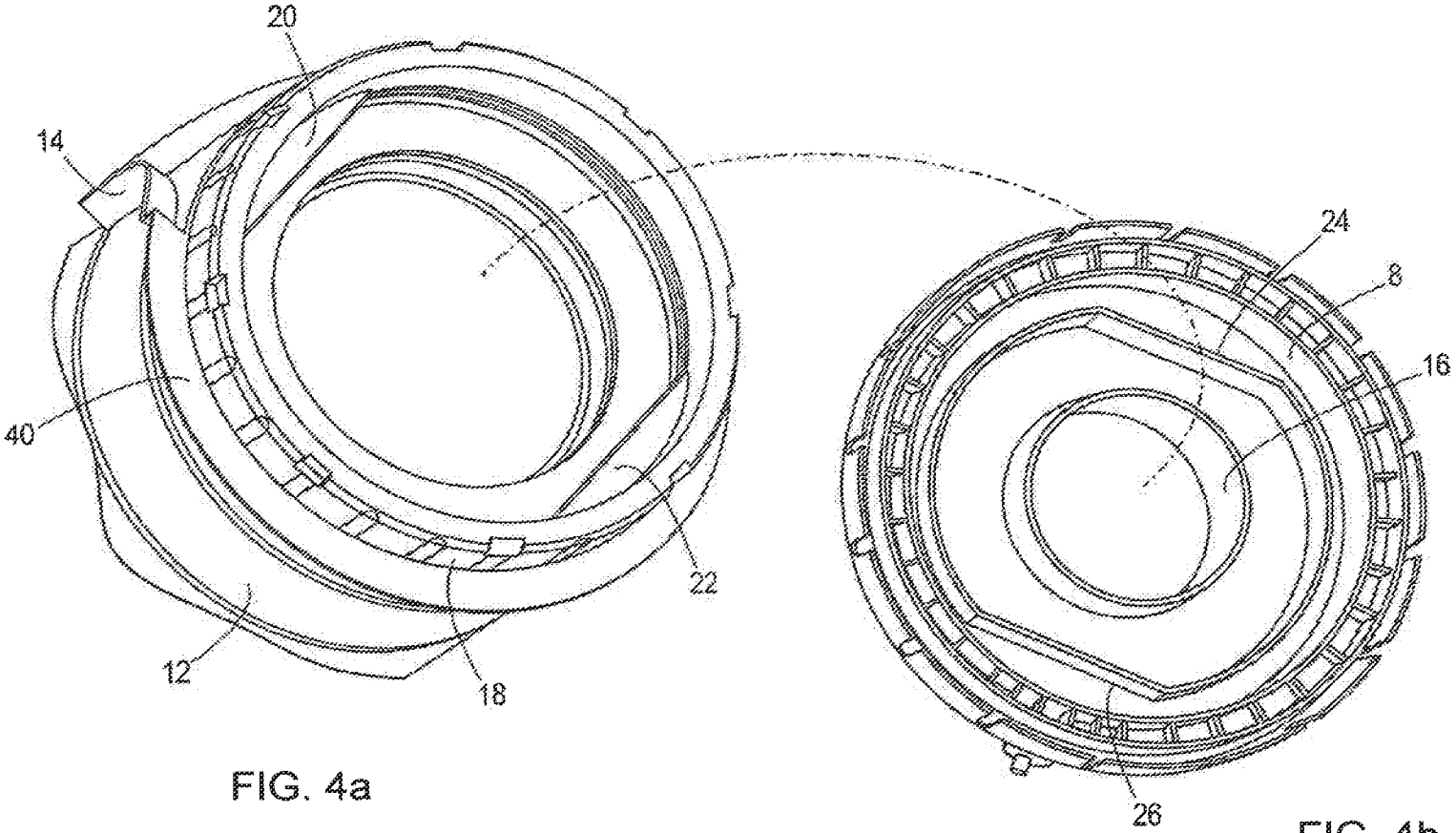
FIGS. 4a and 4b illustrate one embodiment of an end seal cap of a filter element and a corresponding and mating end cap of a housing chamber.

FIGS. 4a and 4b illustrate one embodiment of an end seal cap 18 of a filter element [12] and a corresponding and mating end cap 8 of a housing chamber having an outlet 16 for emitted air. The end seal cap 18 of the filter element [12] includes internal chords 20, 22, which mate with corresponding internal chords 24, 26 on the end cap 8 of the housing chamber and orient the filter element [12] within the housing chamber, for example, such that the ramp 14 aligns with the inlet 6 of the housing chamber 4. The shape bounded by the internal chords and inner perimeter of the circle formed by the end seal cap 18 may be any shape (e.g., a non-circular shapes such as an oval, rectangle with rounded corners, racetrack, etc. to facilitate proper orientation of the element).

Figure 5:
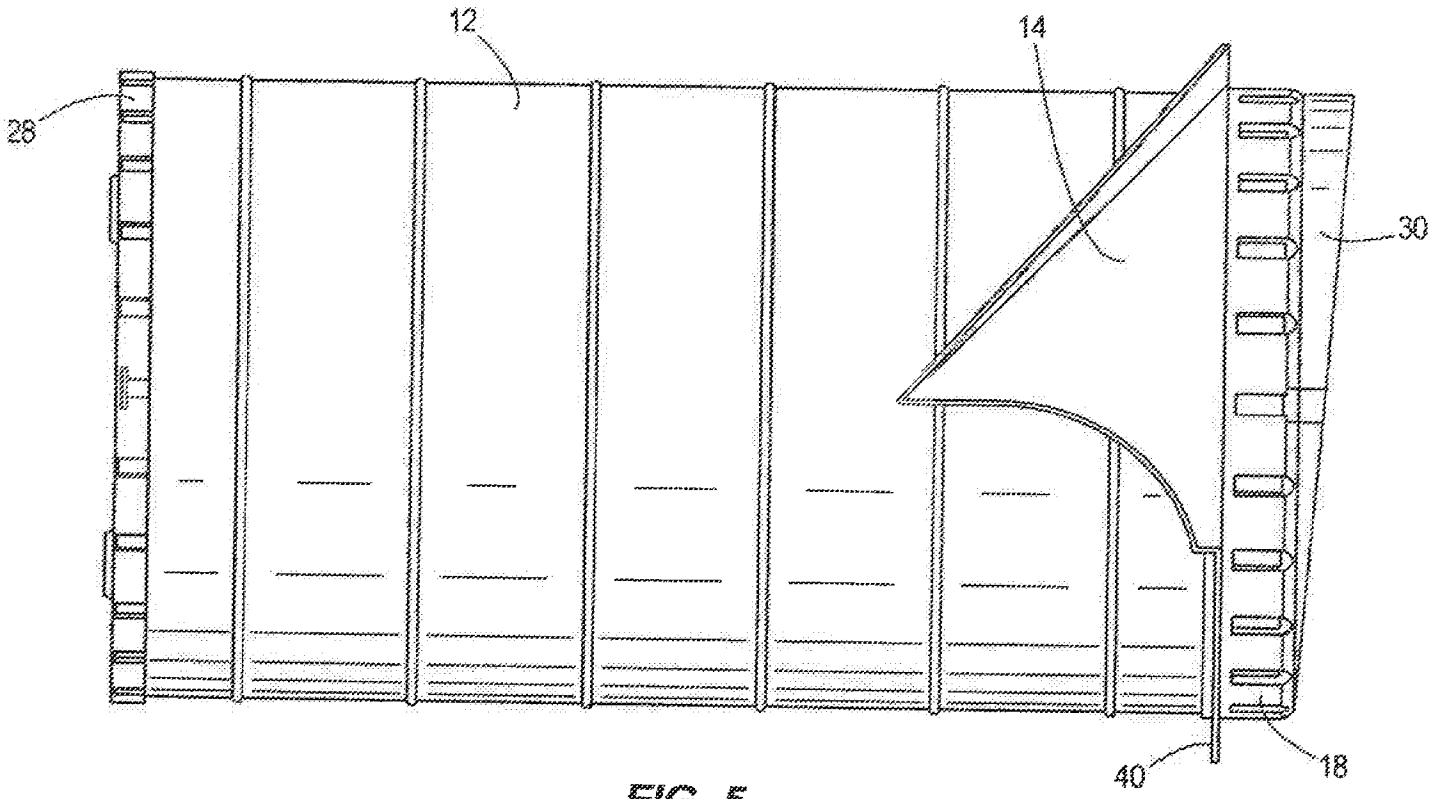
FIG. 5 illustrates one embodiment of a filter element having an end seal cap with a tapered face.
Figure 6A:
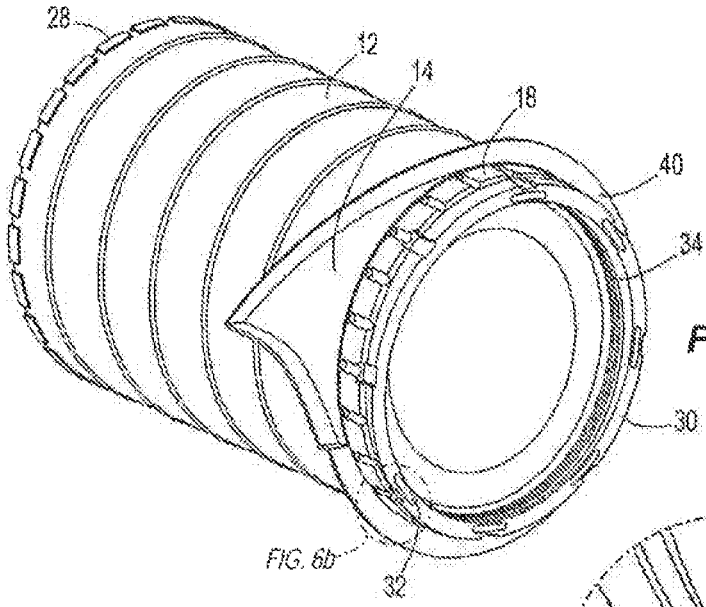
FIGS. 6a, 6b, and 6c illustrate embodiments of orientation element for a filter element and a housing (not shown) including tabs and corresponding slots, male/female chords, and internal radial seals.
Figure 6B:
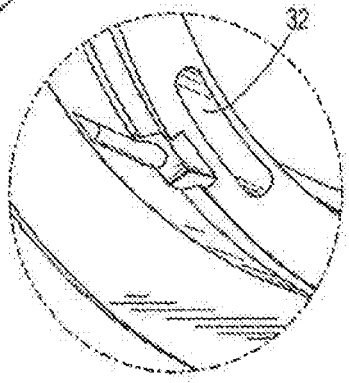
Figure 6C:
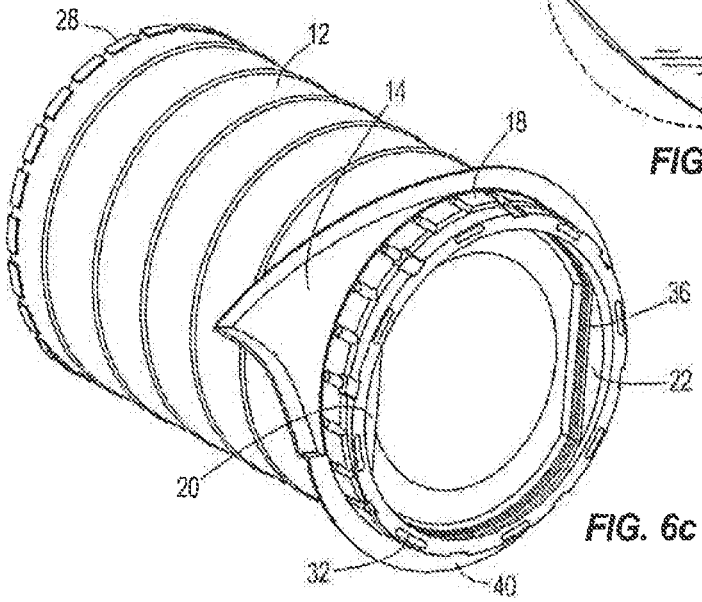
Figure 7A:
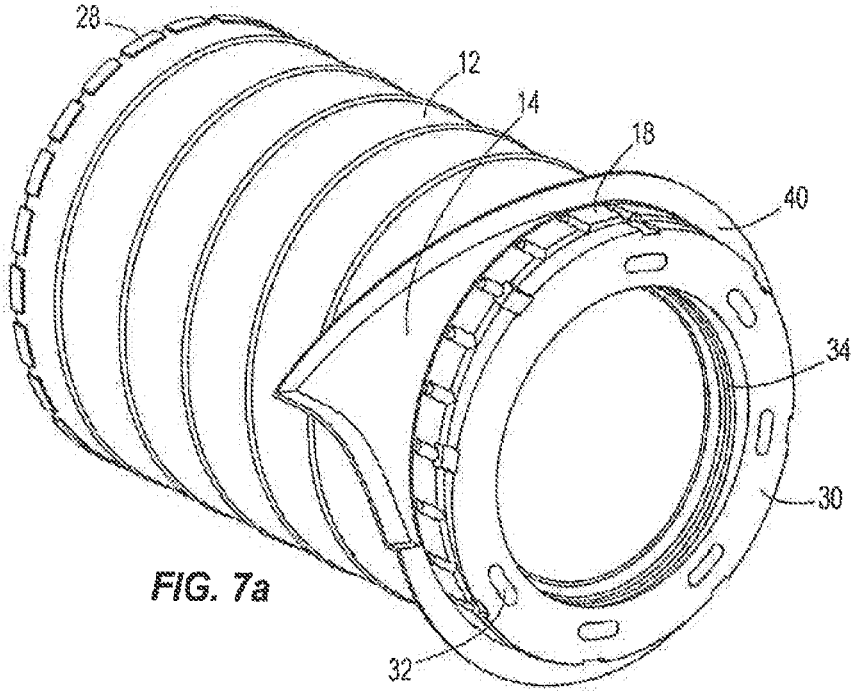
FIGS. 7a and 7b illustrate embodiments of orientation elements for a filter element and a housing (not shown) including tabs and corresponding slots, male/female chords, and internal radial seals.
Figure 7B:
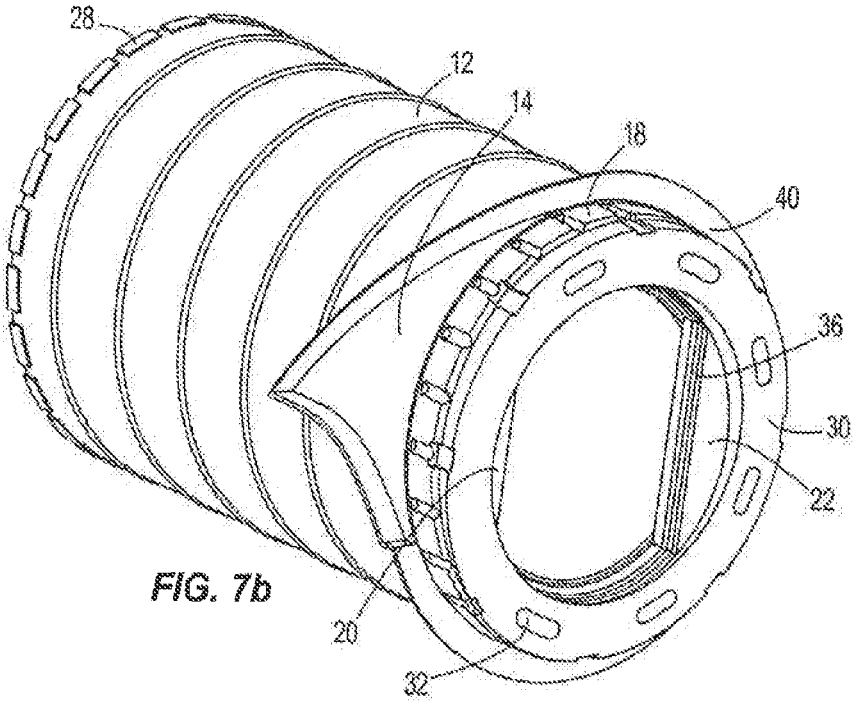

FIG. 5 illustrates one embodiment of a filter element 12 having an end seal cap 18 with a tapered flee 30 and an opposing end cap seal 28. The tapered face 30 typically mates with a corresponding tapered face on an end cap of a housing chamber (not shown).

FIGS. 6a-6c, 7a and 7b illustrate embodiments of orientation elements for orienting a filter element within a housing chamber. Orientation elements may include a tapered face 30 as in FIG. 5 and a corresponding tapered face on the end cap of the housing chamber (not shown). Orientation elements further may include slots 32 on the end seal cap [8] *18* of the filter element 12 that mate with corresponding tabs on the end cap of the housing chamber (not shown). It should be understood that the reverse mating scheme is contemplated whereby the end seal cap of the filter element includes tabs that mate with corresponding slots on the end cap of the housing chamber. Orientation elements further may include internal mating chords on the end seal cap (20, 22 in FIGS. [6b] *6c* and 7b) and corresponding mating chords on the end cap of the housing chamber. (See FIGS. 4a and 4b). The end seal cap further may include internal radial seals 34, 36 for sealing against the outlet 16 of the end cap of the housing chamber. (See FIGS. [4a and 4b] *7a and 7b*). It should be understood that the end caps of the housing further may include radial seals for sealing against the end seal caps of the filter element.

The orientation elements may ensure that the filter element is properly mounted in the housing chamber such that the ramp 14 aligns with the inlet of the housing chamber. As shown in the FIGS. 6a-6c, 7a, and 7b, the ramp 14 may be present on a sleeve 40 as described herein.

Figure 8A:
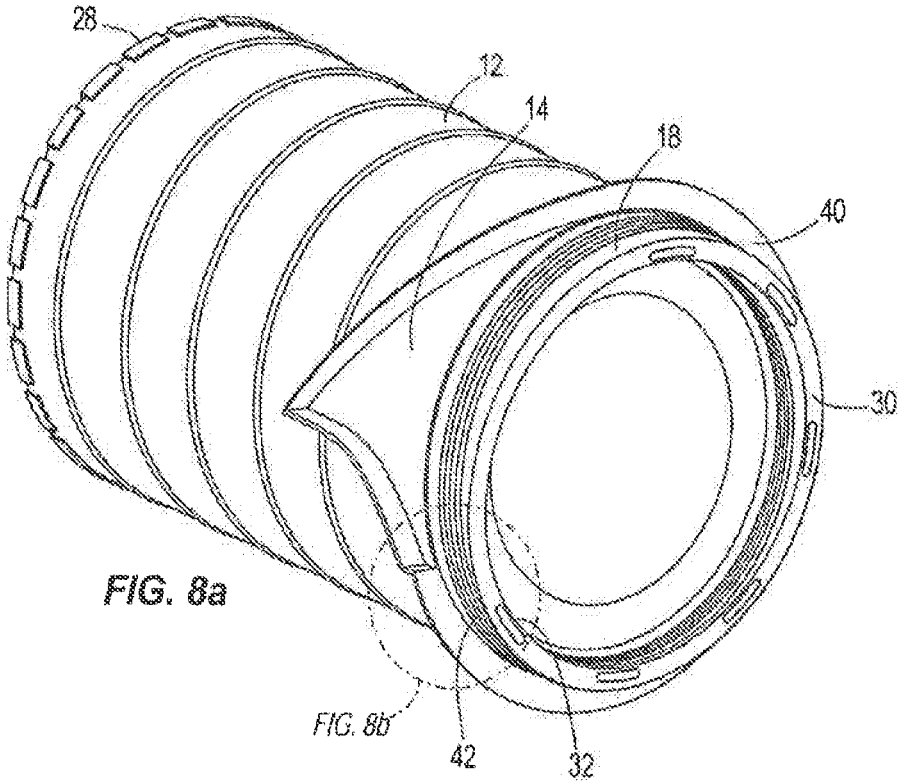
FIGS. 8a and 8b illustrate one embodiment of orientation elements for a filter element and a housing (not shown) including tabs and corresponding slots and facial sealing elements.
Figure 8B:
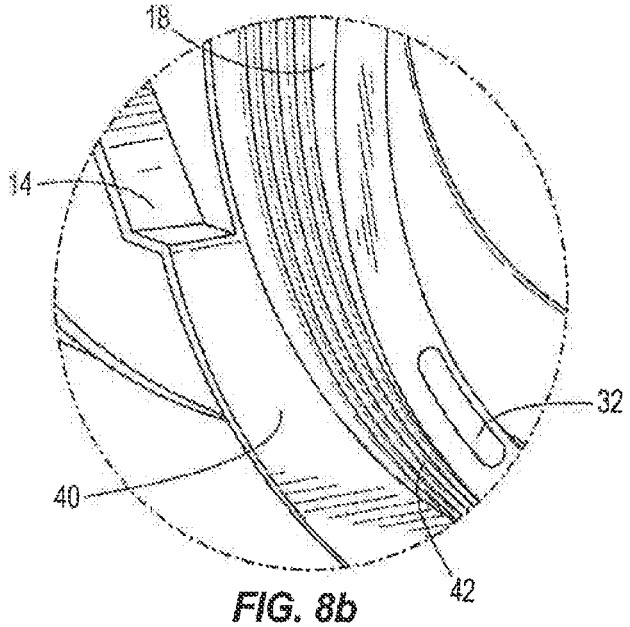
Figure 9A:
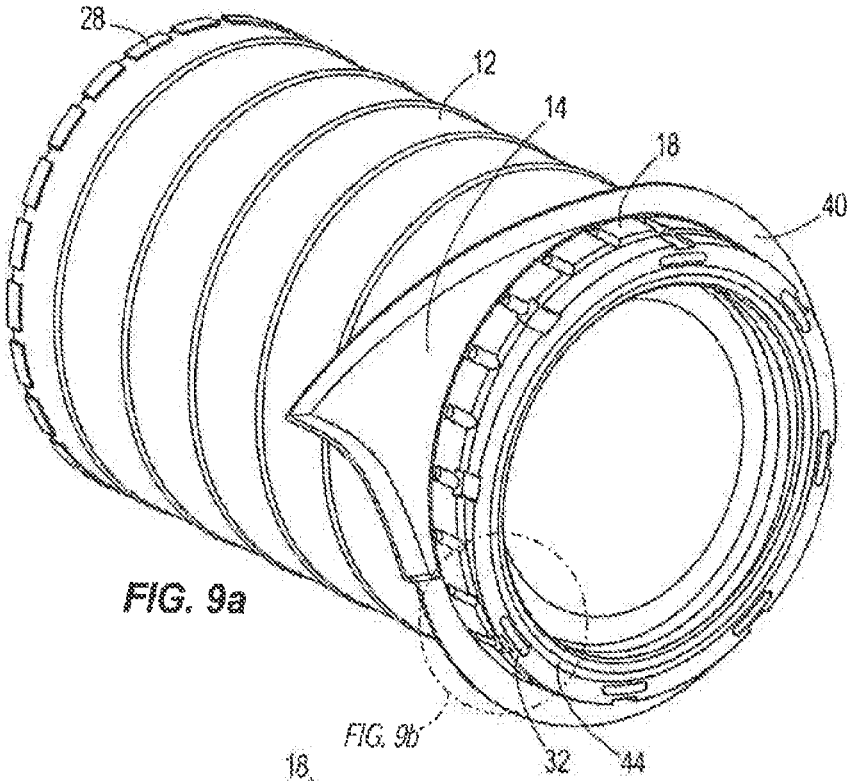
FIGS. 9a and 9b illustrate one embodiment of orientation elements for a filter element and a housing (not shown) including tabs and corresponding slots and external radial sealing elements.
Figure 9B:
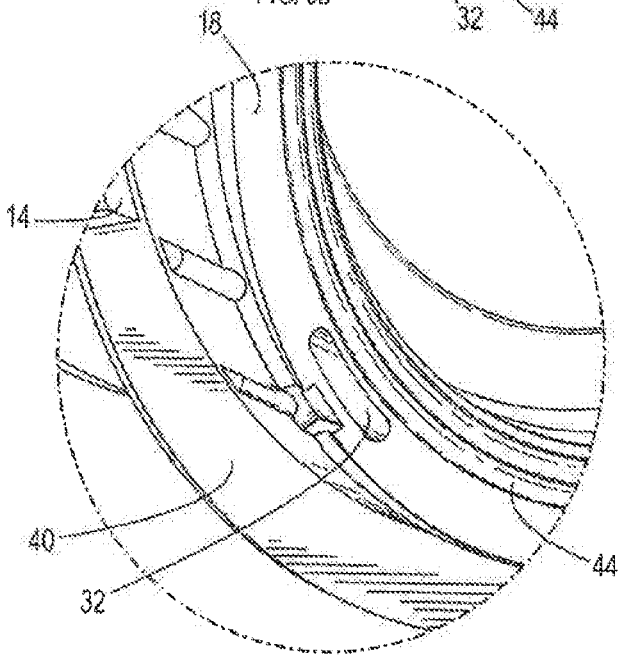

FIGS. 8a and 8b illustrate one embodiment of a filter element 12 having an end seal cap [8] *18* with external radial seals 42 for sealing against an end cap of a housing chamber. FIGS. 9a and 9b illustrate one embodiment of a filter element having an end seal cap [8] *18* with a facial seal 44 for sealing against an end cap of a housing chamber. It should be understood that the end caps of the housing further may include radial seals or facial seals for sealing against the end seal caps of the filter element.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

What is claimed is:

1. A replaceable air filter element mountable in a housing chamber, the *replaceable air filter* element comprising:

filter media having a first end and a second end;

a first end seal cap located at the first end of the filter media, the first end seal cap comprising a first co-acting keyed component; and a second end seal cap located at the second end of the filter media;

the housing chamber comprising a first end cap located at a first end of the housing chamber and a second end cap located at a second end of the housing chamber, the first end cap comprising a second co-acting keyed component, the first end seal cap contacting and sealing against the first end cap of the housing chamber and the second end seal cap contacting and sealing against the second end cap, wherein the first and second co-acting keyed components mating with each other to at least one of: a) orient and permit mounting of the *replaceable air* filter element in the housing; and b) permit mounting of only an authorized *air* filter element in the housing, [namely a] *the authorized air* filter element comprising the [second] *first* co-acting keyed component to mate with the [first] *second* co-acting keyed component of the housing chamber, wherein the first co-acting component is an internal chord having an inner radial seal surface, wherein the inner radial seal surface seals against a mating seal surface of the first end cap.

2. The *replaceable air filter* element of claim 1, wherein the first and second end seal caps of the *replaceable air* filter element respectively contact and seal against the first and second end caps of the housing chamber via facial seals located on the first and second end seal caps of the *replaceable air* filter element or on the first and second end caps of the housing chamber.

3. The *replaceable air filter* element of claim 1, wherein the first and second end seal caps of the *replaceable air* filter element respectively contact and seal against the first and second end caps of the housing chamber via radial seals located on the first and second end seal caps of the *replaceable air* filter element or on the first and second end caps of the housing chamber.

4. The *replaceable air filter* element of claim 1, wherein the first and second co-acting keyed components are non-circular in shape.

5. The *replaceable air filter* element of claim 1, wherein the first and second co-acting keyed components comprise male and female chords.

6. The *replaceable air filter* element of claim 1, wherein the first and second co-acting keyed components comprise a tab and a slot.

7. The *replaceable air filter* element of claim 1, wherein the first and second co-acting keyed components comprise tapered faces.

8. An air filter assembly comprising:

an air filter element comprising filter media having a first end and a second end, the air filter element further comprising a first end seal cap located at the first end of the filter media and a second end seal cap located at the second end of the filter media, the first end seal cap comprising a first co-acting keyed component;

a housing chamber comprising a first end cap located at a first end of the housing chamber and a second end cap located at a second end of the housing chamber, the first end cap comprising a second co-acting keyed component, the air filter element mounted in the housing chamber, the first end seal cap of the *air* filter element contacting and sealing against the first end cap of the housing chamber, the second end seal cap of the *air* filter element contacting and sealing against the second end cap of the housing chamber, wherein the first and second co-acting keyed components mating with each other to at least one of: a) orient and permit mounting of the *air* filter element in the housing; and b) permit mounting of only an authorized *air* filter element in the housing, [namely a] *the authorized air* filter element comprising the [second] *first* co-acting keyed component to mate with the [first] *second* co-acting keyed component of the housing chamber, wherein the first co-acting component is an internal chord having an inner radial seal surface, wherein the inner radial seal surface seals against a mating seal surface of the first end cap.

9. The *air filter* assembly of claim 8, wherein the first and second end seal caps of the *air* filter element respectively contact and seal against the first and second end caps of the housing chamber via facial seals located on the first and second end seal caps of the *air* filter element or on the first and second end caps of the housing chamber.

10. The *air filter* assembly of claim 8, wherein the first and second end seal caps of the *air* filter element respectively contact and seal against the first and second end caps of the housing chamber via radial seals located on the first and second end seal caps of the *air* filter element or on the first and second end caps of the housing chamber.

11. The *air filter* assembly of claim 8, wherein the first and second co-acting keyed components are non-circular in shape.

12. The *air filter* assembly of claim 8, wherein the first and second co-acting keyed components comprise male and female chords.

13. The *air filter* assembly of claim 8, wherein the first and second co-acting keyed components comprise a tab and a slot.

14. The *air filter* assembly of claim 8, wherein the first and second co-acting keyed components comprise tapered faces.

*15. A replaceable filter element mountable in a housing chamber, the element comprising:*

*filter media having a first end and a second end;*

*a first end seal cap located at the first end of the filter media, the first end seal cap comprising a first co-acting keyed component;*

*the housing chamber comprising a first end cap located at a first end of the housing chamber, the first end cap comprising a second co-acting keyed component, the first end seal cap contacting and sealing against the first end cap of the housing chamber, wherein the first and second co-acting keyed components mate with each other to at least one of: a) orient and permit mounting of the replaceable filter element in the housing; and b) permit mounting of only an authorized filter element in the housing, the authorized filter element comprising the first co-acting keyed component to mate with the second co-acting keyed component of the housing chamber, wherein the first co-acting component is an internal chord having an inner radial seal surface, wherein the inner radial seal surface seals against a mating seal surface of the first end cap.*

*16. The replaceable filter element of claim 15, wherein the first end seal cap of the replaceable filter element contacts and seals against the first end cap of the housing chamber via a facial seal located on the first end seal cap of the replaceable filter element or on the first end cap of the housing chamber.*

*17. The replaceable filter element of claim 15, wherein the first end seal cap of the replaceable filter element contacts and seals against the first end cap of the housing chamber via a radial seal located on the first end seal cap of the replaceable filter element or on the first end cap of the housing chamber.*

*18. The replaceable filter element of claim 15, wherein the first and second co-acting keyed components are non-circular in shape.*

*19. The replaceable filter element of claim 15, wherein the first and second co-acting keyed components comprise male and female chords.*

*20. The replaceable filter element of claim 15, wherein the first and second co-acting keyed components comprise a tab and a slot.*

*21. The replaceable filter element of claim 15, wherein the first and second co-acting keyed components comprise tapered faces.*

*22. A filter assembly comprising:*

*a filter element comprising filter media having a first end and a second end, the filter element further comprising a first end seal cap located at the first end of the filter media, the first end seal cap comprising a first co-acting keyed component;*

*a housing chamber comprising a first end cap located at a first end of the housing chamber, the first end cap comprising a second co-acting keyed component, the filter element mounted in the housing chamber, the first end seal cap of the filter element contacting and sealing against the first end cap of the housing chamber, wherein the first and second co-acting keyed components mating with each other to at least one of: a) orient and permit mounting of the filter element in the housing; and b) permit mounting of only an authorized filter element in the housing, the authorized filter element comprising the first co-acting keyed component to mate with the second co-acting keyed component of the housing chamber, wherein the first co-acting component is an internal chord having an inner radial seal surface, wherein the inner radial seal surface seals against a mating seal surface of the first end cap.*

*23. The filter assembly of claim 22, wherein the first end seal cap of the filter element contacts and seals against the first end cap of the housing chamber via a facial seal located on the first end seal cap of the filter element or on the first end cap of the housing chamber.*

*24. The filter assembly of claim 22, wherein the first end seal cap of the filter element contacts and seals against the first end cap of the housing chamber via a radial seal located on the first end seal cap of the filter element or on the first end cap of the housing chamber.*

*25. The filter assembly of claim 22, wherein the first and second co-acting keyed components are non-circular in shape.*

*26. The filter assembly of claim 22, wherein the first and second co-acting keyed components comprise male and female chords.*

*27. The filter assembly of claim 22, wherein the first and second co-acting keyed components comprise a tab and a slot.*

*28. The filter assembly of claim 22, wherein the first and second co-acting keyed components comprise tapered faces.*

* * * * *